(12) United States Patent
Donlagic et al.

(10) Patent No.: US 8,559,770 B2
(45) Date of Patent: Oct. 15, 2013

(54) FABRY-PEROT OPTICAL SENSOR AND METHOD OF MANUFACTURING THE SAME

(75) Inventors: Denis Donlagic, Maribor (SI); Edvard Cibula, Starse (SI); Éric Pinet, Val-Bélair (CA)

(73) Assignee: FISO Technologies Inc., Quebec, Quebec (CA)

( * ) Notice: Subject to any disclaimer, the term of this patent is extended or adjusted under 35 U.S.C. 154(b) by 1067 days.

(21) Appl. No.: 11/885,457

(22) PCT Filed: Mar. 2, 2006

(86) PCT No.: PCT/CA2006/000304
§ 371 (c)(1),
(2), (4) Date: Aug. 31, 2007

(87) PCT Pub. No.: WO2006/092052
PCT Pub. Date: Sep. 8, 2006

(65) Prior Publication Data
US 2008/0159687 A1 Jul. 3, 2008

Related U.S. Application Data

(60) Provisional application No. 60/707,536, filed on Aug. 12, 2005.

(30) Foreign Application Priority Data

Mar. 2, 2005 (SI) .................................. 200500056

(51) Int. Cl.
*G02B 6/00* (2006.01)
(52) U.S. Cl.
USPC .............................................. 385/12; 385/13

(58) Field of Classification Search
USPC ....................................................... 385/12, 13
See application file for complete search history.

(56) References Cited

U.S. PATENT DOCUMENTS

| 4,078,432 A | 3/1978 | Stewart |
| 4,701,614 A | 10/1987 | Jaeger et al. |

(Continued)

FOREIGN PATENT DOCUMENTS

| EP | 0 503 821 A2 | 9/1992 |
| EP | 0 997 721 A1 | 5/2000 |

(Continued)

OTHER PUBLICATIONS

Abeysinghe D.C. et al., "A novel MEMS pressure sensor fabricated on an optical fiber", IEEE Phot. Tech. Lett., 2001, pp. 993 995, vol. 13, No. 9.

(Continued)

*Primary Examiner* — Ryan Lepisto
*Assistant Examiner* — Jerry Blevins
(74) *Attorney, Agent, or Firm* — Fasken Martineau DuMoulin LLP (57) ABSTRACT

A Fabry-Perot optical sensor for sensing a parameter such as pressure or the like is provided. The sensor includes a lead optical fiber from the end of which projects a spacer having an end surface curving inwardly. A diaphragm extends across the forward end of the spacer. The diaphragm is flexible in response to the parameter to be measured and defines a forward reflector of the Fabry-Perot cavity within the optical sensor. A method for manufacturing such a sensor is also provided.

30 Claims, 8 Drawing Sheets

(56) References Cited

U.S. PATENT DOCUMENTS

| | | | |
|---|---|---|---|
| 4,918,305 | A | 4/1990 | Wlodarczyk et al. |
| 4,991,590 | A | 2/1991 | Shi |
| 5,193,129 | A | 3/1993 | Kramer |
| 5,381,229 | A | 1/1995 | Murphy et al. |
| 5,657,405 | A | 8/1997 | Fujiwara |
| 6,539,136 | B1 | 3/2003 | Dianov et al. |
| 6,597,820 | B1 | 7/2003 | Sheem |
| 6,738,145 | B2 * | 5/2004 | Sherrer et al. ............ 356/480 |
| 6,774,353 | B2 * | 8/2004 | Caldwell et al. ....... 250/227.11 |
| 6,820,488 | B2 | 11/2004 | Lenzing et al. |
| 6,823,738 | B1 | 11/2004 | Wlodarczyk et al. |
| 2002/0159671 | A1 * | 10/2002 | Boyd et al. ................. 385/12 |
| 2003/0156788 | A1 * | 8/2003 | Henning ..................... 385/31 |
| 2003/0165290 | A1 * | 9/2003 | Bhagavatula et al. ........ 385/33 |
| 2004/0067005 | A1 * | 4/2004 | Miyazawa et al. ........... 385/13 |
| 2004/0114848 | A1 | 6/2004 | Wang et al. |
| 2004/0223679 | A1 | 11/2004 | Pickrell et al. |
| 2005/0041905 | A1 | 2/2005 | Lagakos et al. |
| 2005/0062979 | A1 | 3/2005 | Zhu et al. |

FOREIGN PATENT DOCUMENTS

| | | |
|---|---|---|
| EP | 1 089 062 A1 | 4/2001 |
| SI | 21242 A | 12/2003 |
| WO | WO 99/45352 | 9/1999 |
| WO | WO 02/23148 A1 | 3/2002 |

OTHER PUBLICATIONS

Abeysinghe D.C. et al., "Novel MEMS pressure and temperature sensors fabricated on optical fibers", J. Micromech. Microeng., 2002, pp. 229 235, vol. 12.

Cibula E. et al., "Miniature fiber optic pressure sensor for medical applications", Proc. IEEE Sensors, 2002, pp. 711-714, vol. 1, No. 12-14.

Cibula E. et al., "Miniature fiber-optic pressure sensor with a polymer diaphragm", Appl. Opt., 2005, pp. 2736 2744, vol. 44, No. 14.

MacPherson W.N. et al., "Miniature fiber optic pressure sensor for turbomachinary applications", Rev. Sci. Instr., 1999, pp. 1868 1874, vol. 70, No. 3.

Pinet É. et al., "Miniature fiber optic pressure sensor for medical applications: an opportunity for intra-aortic balloon pumping (IABP) therapy", Proc. of SPIE, 2005, pp. 234-237, vol. 5855.

Totsu K. et al., "Ultra-miniature fiber-optic pressure sensor using white light interferometry", J. Micromech. Microeng., 2005, pp. 71-75, vol. 15.

Zhu Y et al., "Miniature fiber-optic pressure sensor", IEEE Phot. Tech. Lett., 2005, pp. 447-449, vol. 17, No. 2.

* cited by examiner

FABRY-PEROT OPTICAL SENSOR AND METHOD OF MANUFACTURING THE SAME

RELATED APPLICATIONS

This application is the U.S. National Phase under 35 U.S.C. §371 of International Application No. PCT/CA2006/000304, filed on Mar. 2, 2006, which in turn claims the benefit of Slovenian Application No. SI P-200500056, filed on Mar. 2, 2005, and U.S. Application No. 60/707,536, filed on Aug. 12, 2005, the disclosures of which Applications are incorporated by reference herein.

FIELD OF THE INVENTION

The present invention relates to the field of optical sensors and more particularly concerns a miniature Fabry-Perot sensor which is robust and easy to manufacture.

BACKGROUND OF THE INVENTION

Fiber optic pressure sensors have been topic of intense research during the last decade as they can be made very small, compact, immune to electromagnetic interference, biocompatible and can be used at elevated temperature or in a harsh chemical environment. Applications for such sensors are therefore numerous and range from combustion and jet engine controls to biomedical applications.

It is known in the prior art to provide pressure sensors at the tip of an optical fiber. For example, published international patent application no. WO 02/23148 (WILNER et al.) shows a housing made from silicon in which the end section of a lead fiber and a silicon diaphragm are fixed. The flat cleaved lead fiber end and the diaphragm form two reflective surfaces that define a Fabry-Perot interferometer. The optical signal from the lead optical fiber is split into two paths which mutually interfere. The sum of their interference is function of the distance between the fiber end and the diaphragm position, the latter being a function of pressure.

Other sensors of this type are for example described in patents and patent applications EP 1 089 062; U.S. Pat. No. 4,991,590; U.S. Pat. No. 5,381,229; U.S. Pat. No. 6,539,136; U.S. Pat. No. 5,657,405; U.S. Pat. No. 6,597,820; U.S. Pat. No. 6,820,488; U.S. Pat. No. 6,823,738; US 2004/0223679; US 2005/0041905; WO 99/45352 and WO 02/23148. (Original) The following publications may also be consulted: MacPherson W. N. et al., "Miniature fiber optic pressure sensor for turbomachinary applications", Rev. Sci. Instr., 1999, Vol. 70 n.sup.o3, pp. 1868 1874,); Pinet E. et al. "Miniature fiber optic pressure sensor for medical applications: an opportunity for intra-aortic balloon pumping (IABP) therapy", Proc. of SPIE, 2005, Vol. 5855, pp. 234-237. For all the solutions mentioned in these documents, the typical design produces a sensor that is larger than the diameter of the lead optic fiber used for its interrogation.

U.S. Pat. No. 4,078,432, U.S. Pat. No. 4,701,614, U.S. Pat. No. 4,918,305 and U.S. Pat. No. 5,193,129 describe small micro-binding fiber optic pressure sensors. In all cases, two optical fibers are needed; one for the probing light and the other for the detected light whose intensity is dependent on the pressure applied on the sensor.

European patent EP 0 503 812 discloses a small fiber optic pressure sensor using fluorescence-quenching, suitable for example for arterial blood pressure measurements. The size of such a sensor could be made very close to the optical fiber diameter.

There are very few known devices where the sensor diameter is equal to the diameter of the lead optical fiber. Some examples could be found in patents and patent applications EP 0 997 721, US 2004/0114848. These technologies however have their drawbacks; for example, in EP 0 997 721 the manufacturing procedure is relatively complicated and requires application of special tools and materials. In US 2004/0114848, the intrinsic Fabry-Perot sensor includes a thin film sandwiched between two fiber ends.

Other ultra-miniature pressure sensors have been reported in the literature. The paper by Cibula & Đonlagić "*Miniature fiber-optic pressure sensor with a polymer diaphragm*", Appl. Opt. 2005, Vol. 44 n°14, pp. 2736 2744, and Slovene patent SI 21242 disclose a fiber optic pressure sensor with a polymer diaphragm that is not larger than the size of the optical fiber. Papers by Abeysinghe D. C et al. ("*A novel MEMS pressure sensor fabricated on an optical fiber*", IEEE Phot. Tech. Lett., 2001, Vol. 13 n°9, pp. 993 995,), Abeysinghe D. C et al. ("*Novel MEMS pressure and temperature sensors fabricated on optical fibers*" J. Micromech. Microeng. 2002, Vol. 12, pp. 229 235,) and Totsu K. et al. ("*Ultra-miniature fiber-optic pressure sensor using white light interferometry*", J. Micromech. Microeng., 2005, Vol. 15, pp. 71 75,) all disclose pressure sensors manufactured at the tip of a lead optical fiber using photolithographic patterning techniques.

Other embodiments of miniature sensors are shown in U.S. patent application no. 2005/0062979 (ZHU et al.). The miniature sensor of Zhu is designed by bonding a hollow tube to a lead fiber end-face and then bonding a diaphragm to the hollowed tube to create a Fabry-Perot interferometer. Identical configurations, employing polymer diaphragm, was also reported by Cibula E. et al. ("*Miniature fiber optic pressure sensor for medical applications*", Proc. IEEE Sensors 2002, Vol. 1 n°12-14 pp. 711-714,) and in Slovene patent SI 21242. One drawback of such sensors is the relative fragility of the hollow spacer, both during the manufacturing of the spacer and during its use.

There is therefore a need for a miniature optical sensor which alleviates drawbacks of the prior art.

SUMMARY OF THE INVENTION

In accordance with a first aspect of the present invention, there is therefore provided an optical sensor for sensing a parameter. The optical sensor includes a lead optical fiber, and a spacer projecting forward therefrom. The spacer has an end surface curving inwardly from a forward end of the spacer opposite the lead optical fiber. The optical sensor further includes a diaphragm extending across the forward end of the spacer. The diaphragm is flexible in response to the parameter, and defines a forward reflector of a sensing Fabry-Perot cavity within the optical sensor.

In accordance with another aspect of the invention, there is also provided a method for manufacturing an optical sensor for sensing a parameter. The method includes the steps of:

a) providing a spacer optical element projecting forward from a lead optical fiber;

b) shaping a forward end of the spacer optical element to define a spacer having an end surface curving inwardly from a forward end of the spacer opposite the lead optical fiber;

c) permanently joining a diaphragm optical element to the forward end of the spacer; and d) shaping the diaphragm optical element to define a diaphragm extending across the forward end of the spacer, the diaphragm being flexible in response to the parameter, the diaphragm defining a forward reflector of a sensing Fabry-Perot cavity within the optical sensor.

The present invention advantageously provides Fabry-Perot sensors where the sensing elements may have a diameter as small as the lead optical fiber diameter, hence the reference to a miniature device. The parameter the sensor is sensitive to may for example be pressure, force, acceleration, acoustic waves, vibrations or combinations thereof. The present invention can be particularly useful for applications where the reduced size, electromagnetic interference (EMI) insensitivity, high thermal stability and low drift are important concerns.

Other features and advantages of the present invention will be better understood upon reading of preferred embodiments thereof with reference to the appended drawings.

DESCRIPTION OF PREFERRED EMBODIMENTS OF THE INVENTION

In the following description, similar features in the drawings have been given similar reference numerals and in order to weight down the figures, some elements are not referred to in some figures if they were already identified in a precedent figure.

Figure 1:
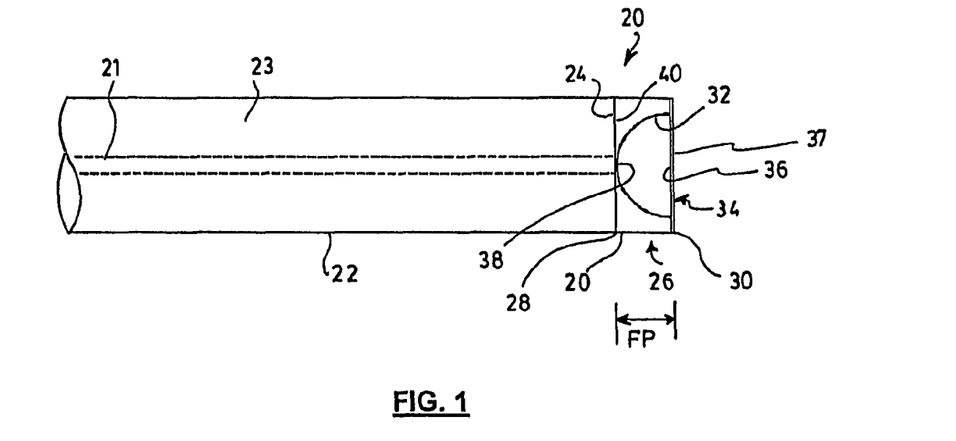
FIG. 1 is a cross-sectional side view of an optical sensor according to a preferred embodiment of the invention.

With reference to FIG. 1, there is shown an example of an optical sensor 20 according to an embodiment of the present invention. The sensor of the present invention is meant for sensing a given parameter. The parameter may be physical or chemical and may for example be embodied by pressure, force, acceleration, acoustic waves, vibrations, combinations thereof, or any other parameter apt to induce a displacement of a diaphragm as will be seen further below.

Optical Sensor

The optical sensor 20 of FIG. 1 first includes a lead optical fiber 22 having an end face 24. The lead optical fiber preferably has a core 21 and a cladding 23, and is apt to guide a light signal towards its end face 24 and guide the reflected light back in the opposite direction. It will be clear to one skilled in the art that the designation of "lead" optical fiber refers to the use of this fiber as a conduit for the sensing light signal and is not meant as representative of any particular property of the optical fiber itself. The lead optical fiber may be single mode or multimode, and may be made of any suitable materials such as pure silica, doped silica, composite glasses or sapphire.

The optical sensor 20 further includes a spacer 26 projecting forward from the lead optical fiber 22. The spacer 26 preferably has a rearward end 28, which preferably defines a substantially flat rearward boundary 40 permanently joined to the end face 24 of the lead optical fiber 22. It will be understood that the adjective of "flat" is used herein in the general sense as opposed to a "curved" surface, and that in practice the rearward boundary may have imperfections which do not substantially affect the operation of the sensor. The spacer 26 further has an end surface 32 which curves inwardly from the forward end 30 of the spacer 26 opposite the lead optical fiber 22. The designations of "rearward" and "forward" are used throughout the present specification to refer to the orientation of components with respect to light coming from the lead optical fiber 22, and are not indicative of any preferential direction.

The end surface 32 is understood to be the surface of the spacer 26 facing the forward end thereof. The expression "curves" is understood as referring to a surface that deviates from planarity in a generally smooth, continuous fashion, and the adjective "inwardly" simply refers to the inside of the spacer. The actual curve defined by the end surface 32 may have a variety of profiles.

The optical sensor 20 further includes a diaphragm 34 extending across the forward end 30 of the spacer 26. The diaphragm 34 is preferably a thin membrane and is flexible in response to the parameter to be analyzed. Preferably, either the front 37 or rear 36 surface of the diaphragm 34 forms a reflector of a Fabry-Perot cavity. Alternatively, if the diaphragm is thin enough, the reflection from the forward reflector can be observed as the sum of reflections at each of the front 37 and rear 36 surfaces of the diaphragm. This situation can be treated either as a double Fabry-Perot cavity or as a single cavity, as reflected light waves from both surfaces will add coherently. The final effect is that the reflected wave encounters a phase shift different from 180 degrees upon reflection, which in general does not require the use of a special signal processing to measure the desired parameter (s). The other reflector of this cavity is preferably embodied by either the end face 24 of the lead fiber 22 or the inwardly curved end surface 32 or the spacer 26. In the latter case, the spacer could be an integral part of the lead optical fiber itself, its extremity having been given the appropriate shape. By definition, a reflector of a Fabry-Perot cavity has reflective or semi-reflective properties. These properties may simply come from the interface between two different media, or be advantageously improved by providing a semi-reflective layer coating onto the appropriate surface. The surface of the diaphragm 34 defining the reflector on the diaphragm side of the cavity may also advantageously be coated with a fully reflective layer to increase light reflection.

A deflection of the diaphragm can be measured for example on the basis of interference of reflected light in the Fabry-Perot cavity, and an appropriate optical signal processing system can deduce therefrom a variation in the measured parameter. The optical processing of the signal is adapted to the characteristics of the Fabry-Perot cavity. It will be understood by one skilled in the art that the different interfaces in the sensor may defined more than one Fabry-Perot cavity, and that appropriate signal processing will select the light from desired one. Alternatively, the light reflected within more than one pair of reflectors, defining plural Fabry-Perot cavities, may be resolved to extract information from each of them or from the resulting combination of them. Sensing by a Fabry-Perot cavity and appropriate signal processing techniques are well known to those skilled in the art and need not to be described further here.

The use of a spacer having a profile as described above, especially provided with an inwardly curved end surface, between the lead optical fiber and the diaphragm ensures a good dimensional stability of the sensor structure during its manufacturing, as will be seen further below. In addition, the provision of a spacer having thicker walls as a result of its inwardly curved shape has been proven to be more dimensionally stable. This makes the optical sensor according to the present invention more robust during manufacturing, packaging and final use.

Figure 5A:
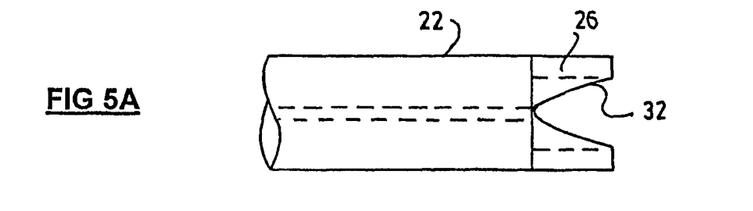
FIGS. 5A to 5E are cross-sectional side views of optical sensors having spacers with curved surfaces of different profiles according to preferred embodiments of the invention.
Figure 5B:
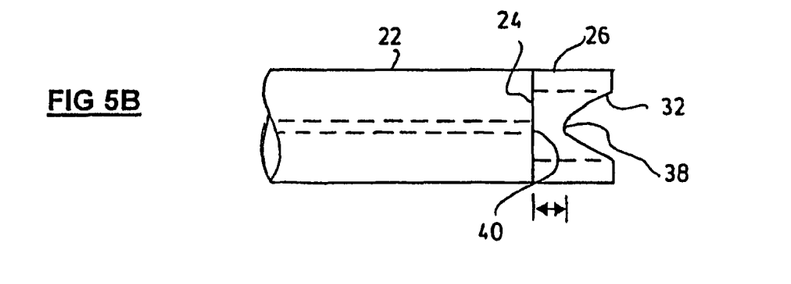
Figure 5C:
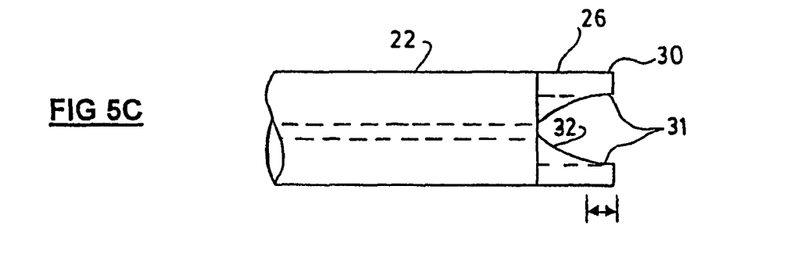
Figure 5D:
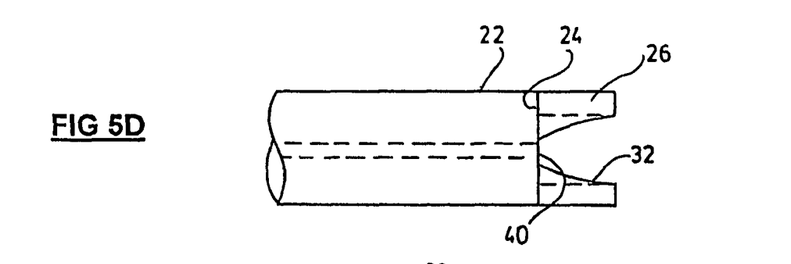
Figure 5E:
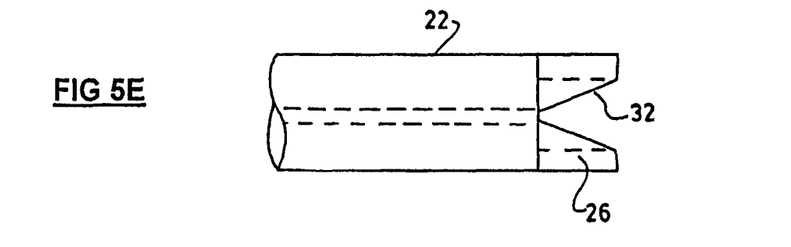

The curved end surface 32 of the spacer 26 may take any appropriate shape. In the embodiment of FIG. 1, it generally defines U-shape and its innermost point 38 reaches the rearward boundary 40 of the spacer 26 at its rearward end 28. Other exemplary spacers 26 having U-shaped and V-shaped profiles are shown in FIGS. 5A to 5E. For example, FIG. 5A shows a spacer 26 having a curved end surface 32 reaching the rearward boundary, similarly to the sensor of FIG. 1. This particular embodiment is preferred for sensors using a single mode lead optical fiber 22. The spacer 26 of FIG. 5B has a curved end surface 32 whose innermost point 38 extends forward of the rearward boundary 40. FIG. 5C shows a spacer 26 where the curved end surface 32 begins at a certain distance inside the cavity, the space 26 thereby defining a tubular portion 31 at its forward end 30. In the embodiment of FIG. 5D, the bottom of the U shape defined by the curved end surface 32 intersects the rearward boundary 40. The embodiment of FIG. 5E shows a V-shaped curved end surface 32.

Figure 6A:
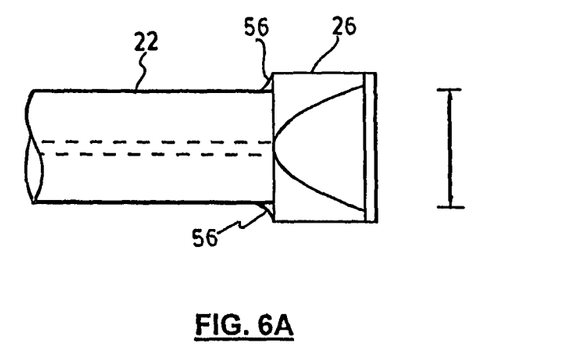
FIGS. 6A to 6C are cross-sectional side views of optical sensors having different spacer shapes according to preferred embodiments of the invention.
Figure 6B:
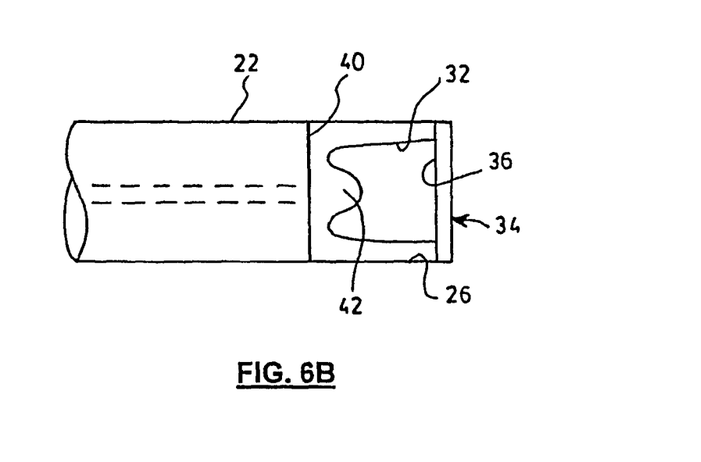
Figure 6C:
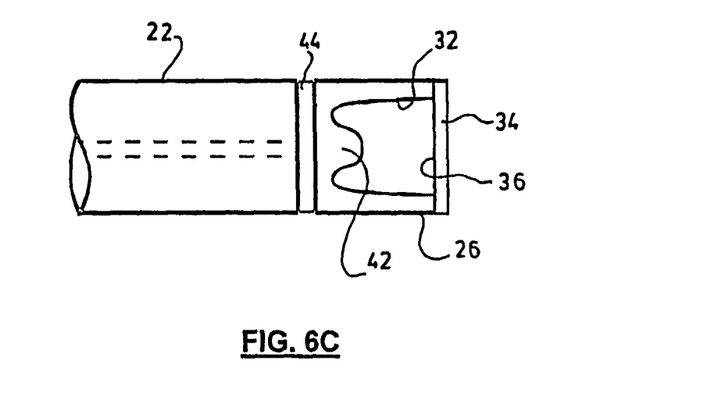

In several preferred embodiments of the invention, the spacer has a diameter substantially equal to the diameter of the lead optical fiber. For some applications, especially those requiring a higher sensitivity of the sensor, the spacer 26 may have a diameter larger than that of the lead optical fiber 22, as for example shown in FIG. 6A. In the embodiment of FIGS. 6B and 6C, the curved end surface 32 of the spacer 26 defines a shape reminiscent of a W. According to this embodiment, the spacer 26 form a protuberance extending forward from its central portion, this protuberance defining a micro-lens 42 in the center of the Fabry-Perot cavity that can focus or collimate light preferably to the inner surface 36 of the diaphragm 34. In the embodiment of FIG. 6C, an additional spacer 44 is provided between the spacer 26 and lead fiber 22, to ensure a proper geometry of the optical setup and to achieve appropriate focusing or collimation of the sensing light within the Fabry-Perot cavity.

Figure 7A:
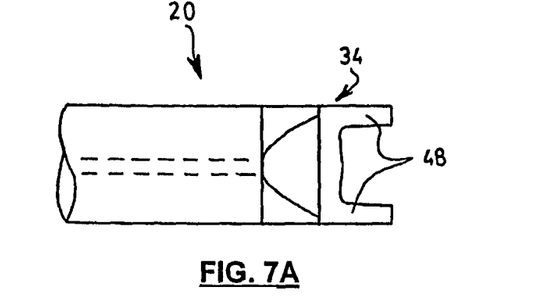
FIGS. 7A to 7D are cross-sectional side views of optical sensors having different diaphragm shapes according to preferred embodiments of the invention.
Figure 7B:
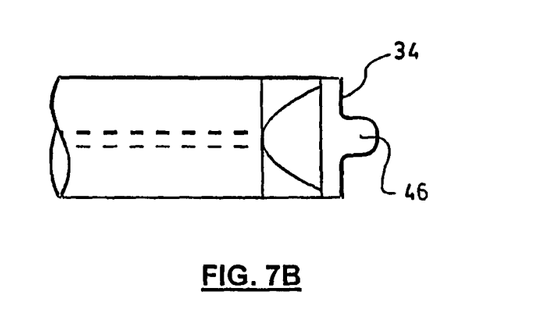
Figure 7C:
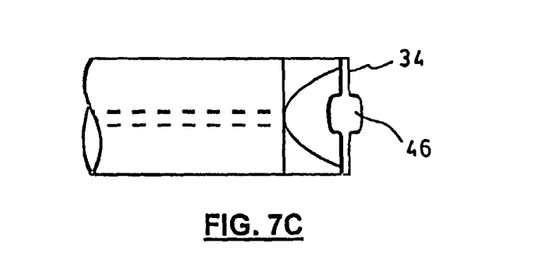
Figure 7D:
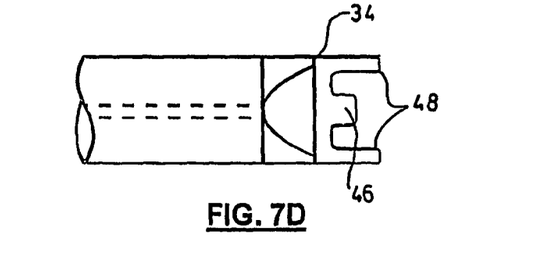

Referring to FIGS. 7A to 7D, it can be seen that the shape of the diaphragm 34 itself may also be used to provide additional advantageous features according to other variants of the present invention. For example diaphragms 34 with non-uniform or corrugated surfaces could be used. Corrugated diaphragm can provide a higher overall sensitivity of the corresponding optical sensor 20 and relax internal stress leading to better sensor stability. For instance, the diaphragm 34 may be provided with a protuberance 46 protruding from its central portion as shown in FIGS. 7B, 7D (protruding forward only) and 7C (protruding both rearward and forward). Such protuberance 46 may advantageously act as an inertial member, making the optical sensor 20 more sensitive to axial acceleration, to acoustic waves or to vibrations. The protuberance 46 is preferably defined by an increased thickness of the diaphragm 34 in its central portion. The presence of this protuberance 46 can also help to reduce deformations in the central portion of the diaphragm 34 so that it retains a more or less flat surface, especially when the diaphragm 34 is deflected, that helps to maintain the visibility of the Fabry-Perot within the whole range of the operation of the optical sensor 20.

The shape of the diaphragm 34 may also be selected to form a protective hollow member 48 projecting forward of the diaphragm, as shown in FIGS. 7A and 7D. The hollow protective member 48 and diaphragm preferably form a monolithic structure. Such a protective hollow member 48 could advantageously protect the diaphragm 34 from mechanical stresses that could occur during sensor packaging or during normal use of the sensor.

Figure 9:
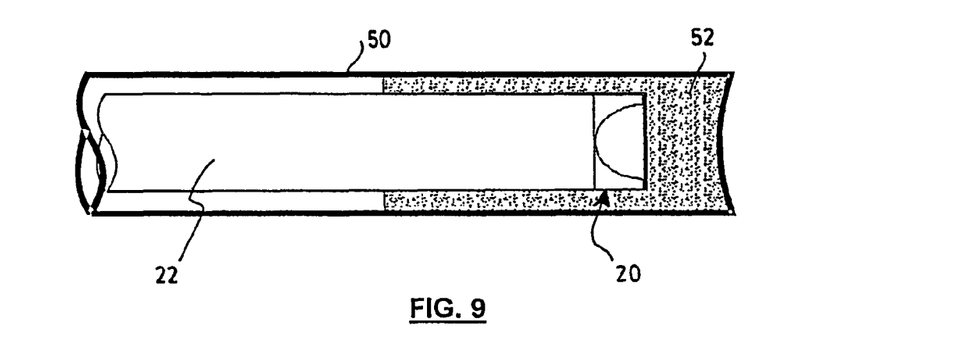
FIG. 9 is a cross-sectional side view of the optical sensor of FIG. 1 packaged in a protective tubing according to another embodiment of the invention.

Referring to FIG. 9, in accordance with another embodiment of the invention, the optical sensor according to any of the variants discussed above may be packaged in a protective tubing 50, preferably of a size comparable to that of the optical sensor. The protective tubing may be made of metal, polymers or any other appropriate material. Such tubing is preferably flexible but may also be rigid, especially for applications where an ultra-miniature size is not a critical issue. As shown in FIG. 9 the optical sensor 20 is preferably slightly retracted inside the protecting tubing 50, not too far from its opening in order to allow stimulus transduction to the sensor while offering an improved protection. The protective tubing may enclose the optical sensor 20 partially or completely, and preferably encloses the entire sensor and a section of the lead optical fiber. It may be filled with a substance 52 selected to transduce the external stimulation to be detected by the sensor while still providing an additional protection for the most fragile exposed parts thereof. Example of appropriate substances include a flexible polymer such as polyurethane, soft rubber or the like, a gel such as silicone gel or hydrogel or the like, a liquid such as mineral or organic oils, water or other appropriate liquids such as the ones with high viscosity, with high surface tensions or liquids or polymers that will preferably not be dissolved in the external medium where the disclosed sensor will be used. For liquids, it is worth mentioning that due to the ultra-miniature size of the sensors obtained in numerous applications of the present invention, the liquids could easily remain trapped inside the protecting tubing simply due to surface tensions and capillary effects. The selection of appropriate liquids and appropriate protecting tubing material will thus be oriented preferably in order to maximize those effects, thereby keeping the substance inside the protecting tubing. It is worth mentioning that in some cases, especially those involving flexible polymers, the substance 52 can also act as protecting tubing 50 providing additional protection for the optical sensor tip while insuring also transduction to the sensor 20 of the external stimulation.

As will be further explained below, the manufacturing of optical sensors according to the present invention preferably include fusion splicing of the different components, which occurs at elevated temperature where the polymeric cladding, that usually protects the commercially available optical fibers, can not survive. As a consequence, when using standard fusion splicers there is usually at least about 0.3 to 1 cm of optical fiber that is stripped from its polymeric buffer that usually protects mechanically the glass from scratches and micro-cracking. It thus worth mentioning that the transduction substance could also advantageously be used to protect the sensor and the most fragile part of the tip of the lead optical fiber. Substances that do not degrade the material of the lead optical fiber should thus preferably be selected.

It is additionally worth mentioning that the protective packaging mentioned above could also present interesting advantages for good stimulus transduction with increased protection of the sensitive and likely to be fragile part of the sensor. When used in a packaging similar to the one shown in FIG. 9, the optical sensor could readily be used as a micro-pressure or micro-force sensor. The portion between the sensor tip and the protective tubing could act as a buffer section against stimulus which otherwise would have been exceeding the range of the sensor, and could have caused its destruction.

The additional protective packaging could finally advantageously be well suited to applications such as for instance medical applications where the size of the sensor, its immunity to EMI, its high sensitivity as well as its low drift are crucial advantages. A potential very interesting application of such packaging would be for instance ultra-miniature instrumented catheters suitable for instance for paediatric or small animals' surgery applications. It is worth mentioning that other additional protective packaging could be designed and used in other applications without limiting the scope of the described preferred packaging and application.

Alternatively other similar designs may for instance be implemented where the end-tip of the package could be filled with a substance that swells or shrinks in presence of a given analyte, such as hydrogels or similar products capable of swelling in presence of water or possibly organic vapors. Such packaging, possibly modified compared to what is schematically illustrated in FIG. 9, could thus be used to make the ultra-miniature Fabry-Perot fiber optic sensor described in the present invention, sensitive to humidity or volatile organic compounds. Numerous designs and applications could be derived from this concept such as for instance the use of a substance that swell or shrink with temperature variations, hence making the sensor sensitive to temperature. Different transduction mechanisms could be used to make the sensor sensitive to other stimuli.

Each of the lead optical fiber, the spacer and the diaphragm may advantageously be made from pure silica, doped silica glass, composite glass as well as from sapphire, the latter being particularly suitable for extreme high temperature applications.

The design and characteristics of a given optical sensor according to the present invention are preferably tailored to the target application thereof. Highly sensitive sensors suitable for measurements of lower and higher industrial pressures may be achieved. A glass-only sensor designs allow for good temperature and chemical stability and provide resistance to other environmental influences. Since the materials suggested above are inert and very stable, extremely low drift with time, outstanding accuracy and consistent sensor performances are achievable. Due to the small size and the nature of these materials, the resulting sensor presents low temperature dependence. This feature is of particular interest not only for applications where a miniature size is essential, but also where sensor stability and precision are crucial. As this is the case for all fiber optic sensors, optical sensors according to the present invention are completely insensitive to electromagnetic interferences and are intrinsically safe. They therefore could operate perfectly in electromagnetic noisy or hazardous environments such as encountered in numerous industrial, chemical or medical applications. Sensors according to the present invention can also be well suited for demanding applications such as oil well down-holes or jet engines pressure monitoring where high pressure and temperature are present. They could be also very useful in challenging fields such as biology (microbiology, genetics . . . ), medicine (paediatrics, diagnostic, patient monitoring or animal testing . . . ), chemistry (microwave chemistry, polymer processing . . . ) and physics (aerospace, micro-fluidics, micro-robotics . . . ). As many sensors may be packed in a very small volume, several sensors could be arrayed and, provided an adequate multi-channels optical interrogation unit is used to read the Fabry-Perot cavities, incredibly localized surface pressure distribution could for instance be measured, offering the opportunity for unique micro-sensing applications. The applications mentioned above are naturally non-limitative examples.

Manufacturing Methods

In accordance with another aspect of the invention, there are also provided several variants of a method for manufacturing an optical sensor for a given parameter as described above.

Referring to FIGS. 2A to 2F, there are illustrated steps of a method according to one embodiment of the invention. The first such step, shown in FIG. 2A, involves permanently joining a spacer optical element 54 to the end face 24 of a lead optical fiber 22. As mentioned above, the lead optical fiber 22 carries a sensing light signal to and from the tip of the optical sensor. It is preferably embodied by a single mode fiber but could be multimode, and may be made of any suitable material such as pure silica, doped silica, sapphire or composite glass. The spacer optical element 54 may be embodied by any element having the necessary characteristics to be transformed through shaping into a spacer having the profile described above. In the preferred embodiment, the spacer optical element 54 is a length of optical fiber having a predetermined etchability profile. For example, it could be embodied by a graded index multimode optical fiber or any other glass element having a suitable distribution of dopants therein. In alternative embodiments, if the lead optical fiber has an appropriate etchability profile, the spacer optical element could be embodied by the extremity of the lead optical fiber itself.

The permanent joining of the spacer optical element 54 to the lead optical fiber 22 is preferably achieved through splicing, which may be accomplished with a standard optical fiber fusion splicer. Standard requirements known in the art should preferably be maintained in order to have good splicing results. One such requirement consists of making sure that the end-faces of both fibers to be spliced should be perfectly cleaved with smooth surface perpendicular to the fiber axis. Both the lead optical fiber 22 and the fiber embodying the spacer optical element 54 may for instance have an outer diameter of 125 µm or less. Larger fiber diameters could also be used, especially if higher sensitivity is desired, as required for instance for medical or acoustical applications. Optionally, fibers having different diameters could be spliced, resulting in an optical sensor such as shown in FIG. 6A. In that case it is usually beneficial to have a larger diameter for the spacer optical element since this will be helpful to increase the final wall thickness, to improve mechanical resistance, as well as to increase the final diaphragm diameter for improved sensor sensitivity. For such an embodiment, a fusion transition 56 at the interface between the two fibers may be created during the fusion splice. Preferably, both the lead optical fiber 22 and the fiber embodying the optical spacer element 54 may have a diameter in the range of 50 to 500 µm, with core sizes between 20 and 475 µm. Fibers having dimensions outside of those ranges could also be used.

In order to improve the signal produced by the Fabry-Perot cavity of the sensor under manufacture, a semi reflective coating may optionally be applied on the end face 24 of the lead optical fiber 22 before it is joined with the spacer optical element 54.

Figure 2A:
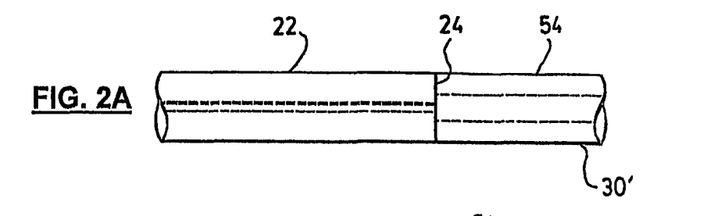
FIGS. 2A to 2F show different steps of a method for manufacturing an optical sensor as shown in FIG. 1.
Figure 2B:
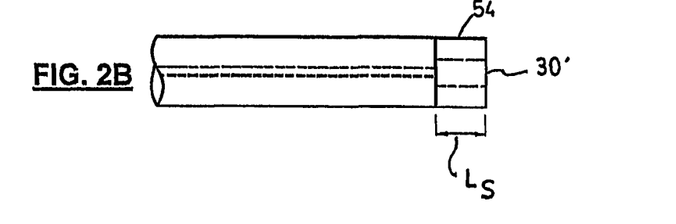

The method of the present invention includes a second step of shaping the forward end 30' of the spacer optical element in order to obtain the desired spacer profile. Preferably, this is accomplished in two sub-steps. The forward end 30' of the spacer optical element 54 is first cleaved to reduce its length $L_s$, typically to about 10 to 100 μm. This is illustrated in FIG. 2B. Cleaving may be performed using standard cleaving mechanical tools (scribe and break, ultrasonic cleaving, etc.) or by other techniques known in the art, such as for example $CO_2$ laser cleaving techniques. With such techniques, if appropriate visual diagnostic and displacement tools are implemented, a precise and reproducible cleave could be obtained, which could be very useful if batch processes are established in order to reduce production costs of the sensor. If the cleaved length $L_s$ of the spacer optical element 54 is slightly above the appropriate targeted value, it is possible to add a controlled mechanical polishing step.

Figure 2C:
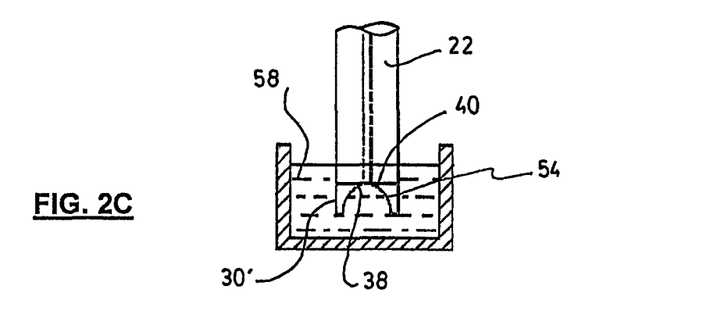
Figure 2D:
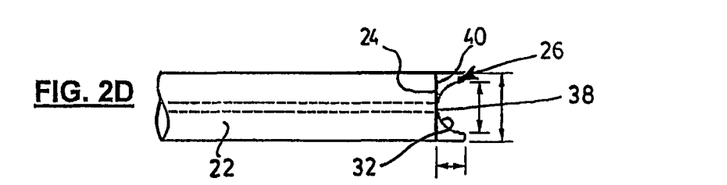
Figure 10:
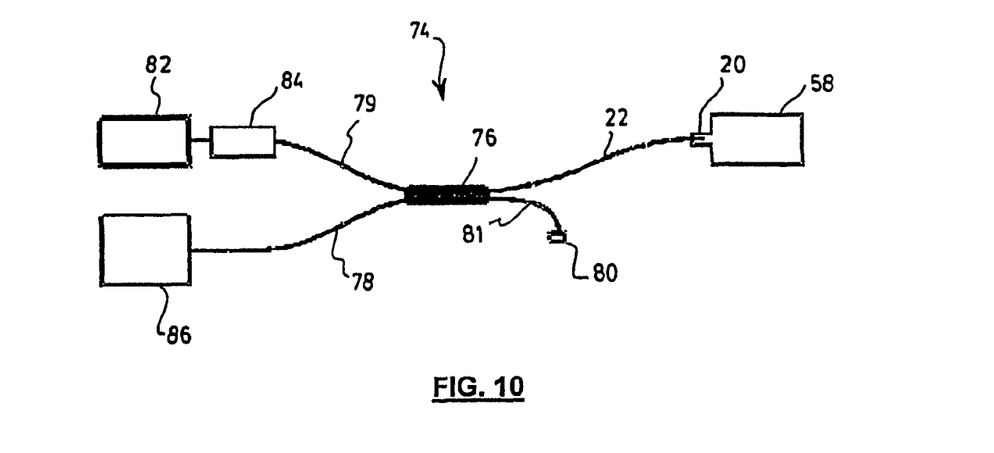
FIG. 10 is a schematized illustration of an experimental set-up to perform an interrogation of an optical sensor according to an embodiment if the invention.

The second sub-step of the shaping of the forward end 30' of the spacer optical element 54 further involves shaping its end surface 32 so that it curves inwardly, as explained above. This is preferably accomplished by dipping the forward end 30' of the spacer optical element 54 in an appropriate etching medium 58 selected as a function of the etching properties of the spacer optical element, such as a buffered HF and $NH_4F$ etching solution or pure HF acid, as shown in FIG. 2C. The etching medium may be in a liquid or gaseous phase. The spacer optical element 54 preferably has an etchability profile selected so that etching will result in an inwardly curved surface having the desired shape. For example, if a standard graded index fiber is used, the core, doped with $GeO_2$ will etch at a much higher rate than the cladding, and the etching rate will be higher in the center of the core as the $GeO_2$ concentration is greater there. For example, the measured etching rate of the center of standard 62.5 μm multimode fiber core is about 7 μm/min, and the cladding, generally made of pure $SiO_2$, etches at approximately 0.5 μm/min. Parts of the core between its center and the cladding etch at proportionally lower etching rates than the center. The etching process could run until the innermost point 38 of the curved end surface 32 reaches the boundary 40 between the lead fiber 22 and the created spacer 26, as shown in FIG. 2D. For some applications, it could be important that the etching be stopped at the moment when this boundary is reached as the end face 24 of the lead fiber 22 may be otherwise damaged, resulting in a quick drop in its reflectivity. The structure obtained in this way is preferably neutralized and cleaned in an ultrasonic cleaner. With a preferred appropriate design known in the art (Cibula & Đonlagić, "*Miniature fiber-optic pressure sensor with a polymer diaphragm*", Appl. Opt. 2005, Vol. 44 no14, pp. 2736 2744,) it is possible to continuously monitor the light reflectivity during the etching process in order to precisely determine when the chemical etching should be stopped. This may for example be achieved using appropriate optical monitoring equipment connected to the lead optical fiber 22, such as shown in FIG. 10. The highest reflectivity is usually achieved when the innermost point 30 of the forward end surface of the spacer is etched exactly or to sub-wavelength distance away from the interface between the spacer 26 and the end face of the lead optical fiber. The monitoring equipment 74 could for example be embodied by a 2×2 coupler 76 coupling the lead optical fiber 22 to other optical fibers 78, 79 and 81. The optical fiber 81 preferably has one end inserted into an index matching gel 80 to avoid back reflections. The optical fiber 79 has one end connected to an optical source 82, such as an accordable laser source or simply a broadband white light source optionally coupled to a depolarizer or a filter 84. The optical fiber 78 has one end connected to a light detector 86, such as a power meter or the like, preferably to observe the signal reflected by the optical sensor 20 in the etching medium 58. When the signal rises and achieves its maximal value, the etching is stopped as this condition indicates that the innermost point of the end surface of the spacer has reached the end face of the lead fiber. Alternatively the etching could be stopped also when the signal reaches a given value if partial etching is desired. If a good control of the length $L_s$ of spacer optical element has been achieved in the cleaving and/or polishing sub-step (e.g. by using $CO_2$ laser cleaving techniques known in the art, or controlled polishing), the etching process could be performed in batches with only a few lead optical fibers being monitored. Such an arrangement could be economically very valuable.

The desired spacer profile may advantageously be obtained through the selection, as the spacer optical element, of a length of optical fiber having a core provided with a gradient distribution of dopants in the radial direction. For example, fibers with the graded cores doped with $GeO_2$, $TiO_2$, $P_2O_5$ or the like can be very selectively etched in HF acid. In these cases, the regions of the core having the highest concentration of dopants will etch at the highest rate. Preferably, the concentration of dopants is the highest in the center and decreases towards the edges of the core. The reversed situation is also possible, provided that an appropriate etching solution, such as $NH_4F$ buffered HF, is selected to achieve the highest etching rate in regions where the lowest dopant concentration is present.

Figure 2E:
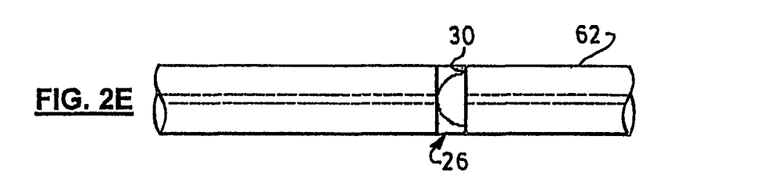

Referring to FIG. 2E, the method of the present invention next includes a step of permanently joining a diaphragm optical element 62 to the forward end 30 of the spacer 26. The diaphragm optical element 62 may be embodied by a length of standard or non-standard single mode or multimode fiber, with or without a doped core, by a doped or undoped solid rod, etc. In the preferred embodiment, the permanent joining is accomplished by splicing, preferably with the help of a fusion splicer. The diaphragm will define a reflector of a Fabry-Perot cavity in the sensor, the other reflector of this cavity being defined by either the end face of the lead optical fiber or the inwardly curved surface of the spacer.

Both reflectors of the Fabry-Perot cavity, embodied by the end face of the lead fiber or the inwardly curved end surface of the spacer on one side and the rear surface of the diaphragm optical element may be provided with a reflective coating prior to their respective splicing. The coating on the lead fiber side should be semi-reflective, whereas the coating on the diaphragm could also be fully reflective coating such as the one obtained with thick metallic coating (such as Cr, Al, Ag, Au, Ti and the like). Such coatings that could improve the finesse or level of back reflected light of the FPI could be obtained using various deposition techniques. Thin metallic coating (e.g. titanium and the like) or preferably oxides coating (e.g. $TiO_2$, $ZrO_2$, $Ta_2O_5$, $Al_2O_3$ and the like) or semiconductor thin coating (e.g. silicon nitride and the like) could be used for such purposes in single or multiple layers. If appropriately selected, such coating could also serve as chemical etch-stop for the next step of the process in order to avoid that the chemical etching modifies the first Fabry-Perot interference surface.

Figure 2F:
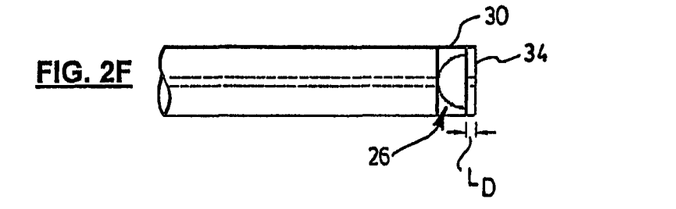

The present method next includes a step of shaping the diaphragm optical element to define a diaphragm 34 extending across the forward end 30 of the spacer 26, as shown in FIG. 2F. This may be accomplished in a variety of manner. In one embodiment of the invention, the shaping of the diaphragm optical element includes a sub-step of cleaving its forward end to a predetermined length $L_D$, for example at a distance between 5 and 100 μm away from the tip of the spacer 26, as shown in FIG. 2F. A tight control of the length $L_D$ is preferable as the results of this cleaving process may have an important impact on the sensor performances. The different cleaving techniques described above in relation to the cleaving of the spacer optical element may again be used here for the cleaving of the diaphragm optical element. Different techniques may be used for cleaving different components of a given sensor. If a good control of the cleaving is achieved, further shaping of the diaphragm may not be necessary and a functional sensor could be obtained from this step. Since the minimum desired thickness of the diaphragm obtained from cleaving is rarely bellow 2 to 5 μm (otherwise the risk of breaking the diaphragm during cleaving is too high and precise control over mechanical cleave positioning is limited), high pressure sensors (such as 0-100 MPa) could be produced directly at that sub-step. For increased sensitivity sensors manufacturing, the following sub-steps are usually necessary.

Figure 3:
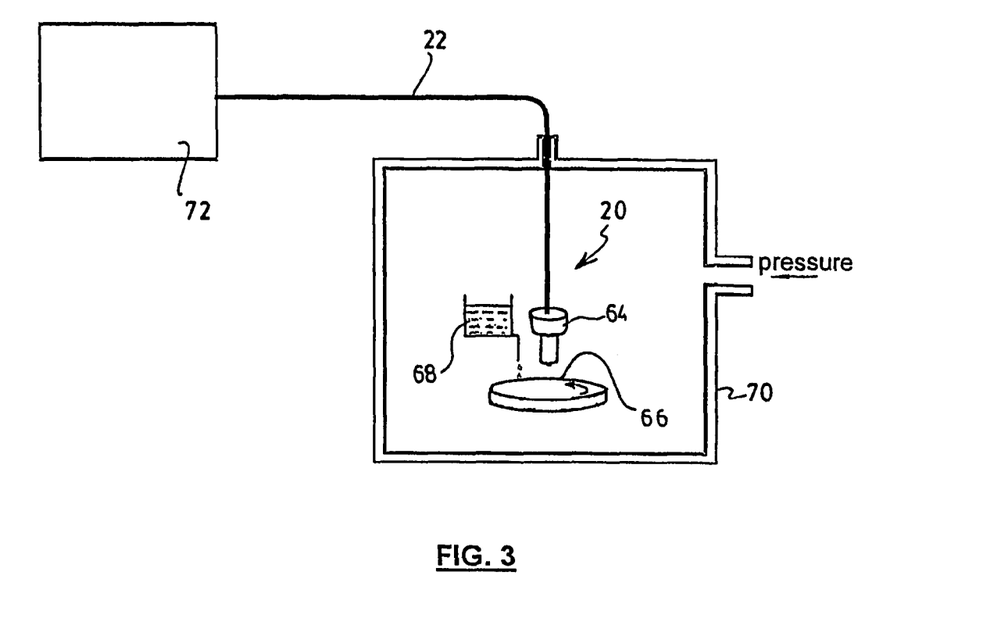
FIG. 3 is a schematized illustration of an experimental set-up to perform a polishing step according to a preferred embodiment of the invention.

The cleaving of the forward end of the diaphragm optical element may be replaced or followed by a mechanical polishing sub-step. Through an appropriately controlled polishing, the length $L_D$ of the diaphragm may be reduced down to about 1 to 5 μm. Standard polishing technique may be used with special care of the sensitive and brittle parts of the sensor. As shown in FIG. 3, the polishing sub-step is preferably realized by mechanically maintaining the sensor 20 into a fiber optic connector ferrule 64 placed perpendicularly to a preferably rotating polishing surface 66 such as polishing papers of different grit-sizes. For example, polishing paper of 1 to 3 μm grit-sizes may be first used followed by a 0.3 to 0.5 μm grit-size paper for the last micron. Water, alcohol or another polishing medium 68 could advantageously be used for a surface finish of better quality. For measurements of low pressures, such as for example required for most medical applications, diaphragm thickness even smaller than achievable with the technique described above may prove necessary. In such a case, further control of the polishing sub-step may be achieved by performing it in a pressurized vessel 70, and connecting the lead optical fiber 22 to an optical interrogation unit 72 which measures the response of the sensor 20 according to pressure variations imposed into the pressurized vessel 70. The polishing sub-step is ended once the sensor sensitivity reaches a targeted value.

Figure 4:
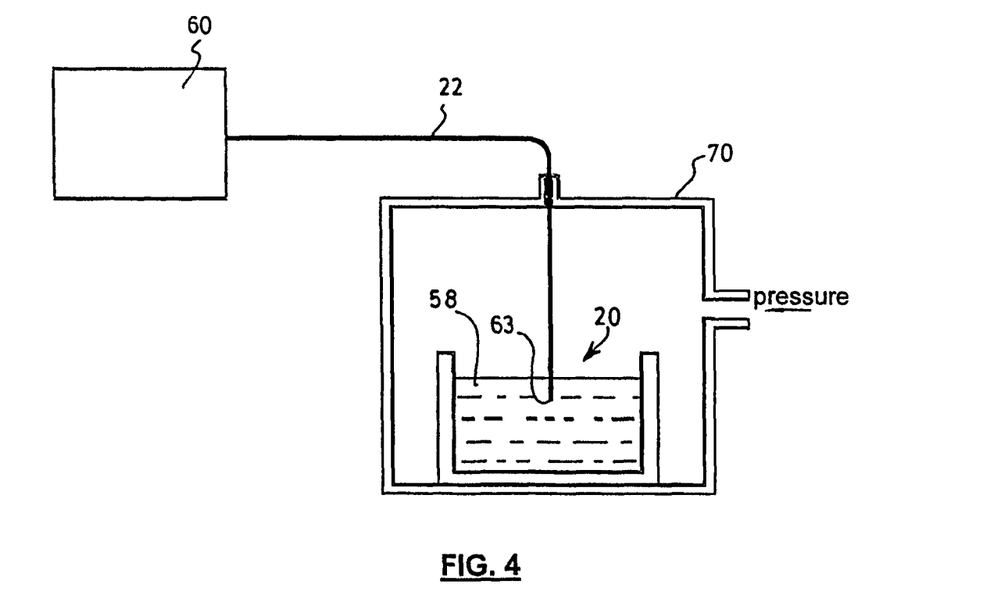
FIG. 4 is a schematized illustration of an experimental set-up to perform an etching step according to a preferred embodiment of the invention.

For certain pressure ranges, the controlled polishing described above may be sufficient to shape the diagram to the desired thickness. For applications requiring a particularly high sensitivity, the shaping of the diaphragm may further include an etching sub-step. Referring to FIG. 4, an exemplary set-up for performing such an etching of the diaphragm optical element is shown. An appropriate etching medium 58, such as a buffered HF and $NH_4F$ etching solution, is prepared and the forward end 63 of the diaphragm optical element is dipped therein. The etching medium 58 is preferably selected according to the physical characteristics of the diaphragm optical element. For example, if a glass rod or an optical fiber with an undoped core is used, the etching may be performed also in pure HF acid. It may alternatively be advantageous to use an optical fiber having a germanium doped core as the area doped with germanium etches at a lower rate as the pure silica ($SiO_2$) areas. This may prevent the formation of holes in the diaphragm.

In the embodiment of FIG. 4, the lead optical fiber 22 is connected to an appropriate signal conditioning system 60 which interrogates the optical sensor 20. Setups different from the one shown in FIG. 4 could of course be considered. The signal conditioning system 60 may be based on single wavelength, multiple wavelengths or even white light interferometry technologies such as available commercially. The optical sensor 20 is enclosed together with the etching medium 58 in a pressurized vessel 70 in which pressure is preferably cyclically changed, within the target sensor pressure range (or only in part of this pressure range). The response of the optical sensor 20 is observed by the signal conditioning system 60 in real time. As the diaphragm is etched by the etching solution, its thickness decreases and its sensitivity increases. When the desired sensitivity and/or pressure range is achieved, the optical sensor 20 is removed from the etching solution 58 and neutralized. This embodiment allows for arbitrary sensitivity and pressure range of the optical sensor while it assures good repeatability of its manufacturing process. Such a process could of course be performed in batches with good process control. A well monitored control of the shaping of the diaphragm can result in a diaphragm thickness $L_D$ bellow 1 μm, which can provide very high sensor sensitivity. Such very high sensitivity is advantageously useful for applications where good resolution as well as good accuracy is required.

Selective etching of the diaphragm may also be used to give the diaphragm a particular shape. According to a preferred embodiment of the invention, the diaphragm may advantageously be shaped so as to define a protective hollow member 48 projective from its forward end, as shown in FIGS. 7A and 7D. In other words the flexible portion of the diaphragm is in effect "retracted" inside the sensor. Such a protective hollow member could thus advantageously protect the flexible portion of the diaphragm from mechanical stresses that could occur during sensor packaging or during normal use of the sensor. The flexible, central portion of the diaphragm is preferably as flat as possible in order to allow a good quality Fabry-Perot cavity. Alternatively, a slightly convex shape (see diaphragm 34 of FIG. 7D) could also be used in order to produce a better flat surface once the diaphragm is deflected. Such shape could also advantageously be used to refocus the light into the center part of the lead fiber and thus to increase the light injected back into the lead fiber.

According to one embodiment of the invention, the use of specialty fiber as the diaphragm optical element instead of a coreless fiber, a single mode fiber or a standard multimode fiber could provide interesting advantages without adding complexity to the manufacturing process. If the diaphragm optical element is provided with an appropriate doping profile, selective etching may be achieved to create diaphragms of various shapes. For example, diaphragms having non-uniform or corrugated profiles could be produced. Corrugated diaphragm can provide higher sensitivity and internal stress relaxation leading to better sensor stability. Referring to FIGS. 7B, 7C and 7C there are shown three such embodiments where the diaphragm is shaped so as to define a protuberance 46 in its central portion. The protuberance 46 may project forward as shown in FIGS. 7B and 7D, rearward, or both as shown in FIG. 7C. It will noted that to obtain the sensor of FIG. 7D, etching of the diaphragm optical element prior to its splicing to the spacer will be required to form the rearward projecting portion of the protuberance 46. The protuberance 46 could advantageously be used as inertial device for making the sensor more sensitive to axial acceleration, to acoustic waves or to vibrations.

As mentioned above, the use of semi-reflective coating on at least one surface of the Fabry-Perot cavity, or of a fully reflective coating on at most one surface of the Fabry-Perot cavity, could preferably be used to improve the performance of the optical sensor. The use of such coatings could however be problematic when combined with fusion splicing, especially when the fusion has to be done on a surface at least partially coated. The approach that will now be disclosed makes possible to use of advantageous coatings and solves the problems associated with the fusion bonding or splicing. Referring to FIG. 8A to 8E, there is shown such an embodiment of the invention where the method explained above includes a step of shaping the rearward end of the diaphragm optical element, prior to its splicing to the forward end of the spacer, to form a hollow additional spacer.

Figure 8A:
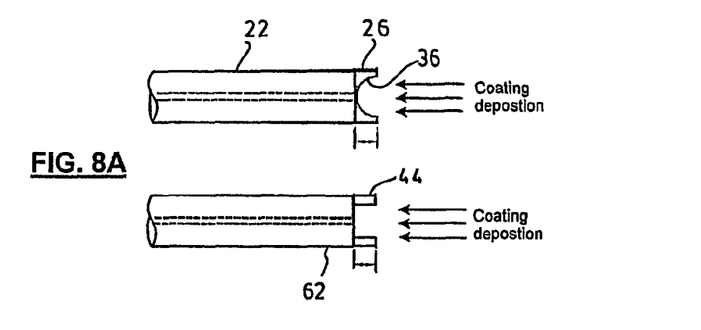
FIGS. 8A to 8E show different steps of a method for manufacturing an optical sensor according to another embodiment of the invention.

Referring more particularly to FIG. 8A, this embodiment of the method of the present invention first include a step of creating a spacer having an inwardly curved end surface at the end of a lead optical fiber 22 any of the different approaches described above could be used for this purpose. Different cavity profiles-could be obtained as also described above. A diaphragm optical element 62 is also shaped to form a hollow cavity, simultaneously or at a different time than the shaping of the spacer. The hollow cavity will define a hollow additional spacer 44 as will become apparent below. The hollow cavity may be formed by providing an additional spacer element at the rear end of the diaphragm optical element, and shaping this additional spacer element to form the hollow additional spacer 44. This may be accomplished by etching of the core of an optical fiber embodying the additional spacer element, or by fusion splicing an additional fiber thereto. The sum of the cavities defined at the extremities of the spacer and of the diaphragm optical element should preferably be larger than the desired Fabry-Perot cavity length of the desired optical sensor, but a tight control of the length or of the quality of the end surfaces are not very critical at this stage of the process, although the bottom of each cavity should preferably be smooth and clean. An ultrasonic cleaning step is however recommended for better performances. As shown in FIG. 8A, the extremities of both fibers are then coated. If the same coating is used on both surfaces the coating may be performed simultaneously. Separate coating procedures may be used if different coatings are selected.

Preferably, a semi-reflective coating is used for the cavity of spacer and a fully or semi-reflective coating is preferably used for the cavity of the diaphragm optical element.

Figure 8B:
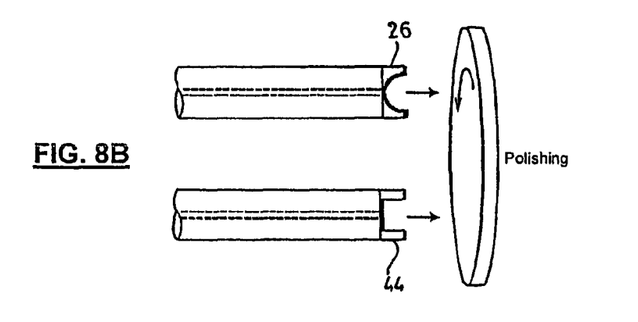
Figure 8C:
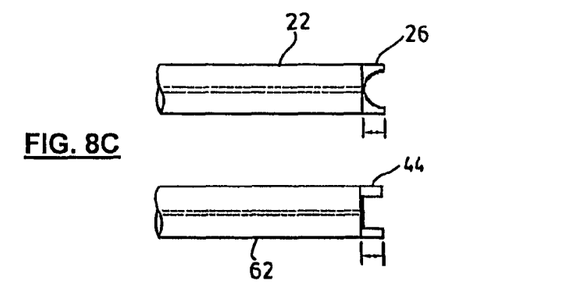

Referring to FIG. 8B, once the coating is done, the end-surfaces of the two cavities (defined by the spacer 26 and the additional hollow spacer 44) are preferably polished. This may be accomplished using a polishing plate by standard processes such as detailed previously. The result of the polishing step is shown in FIG. 8C. The polishing step preferably has two requirements: first it should remove perfectly the coatings at the extremities of both cavities to leave the surfaces to be joined free from coating or other contaminations, and second it should be controlled so that the sum of the polished cavity lengths should equal or be close to the length of the desired Fabry-Perot cavity.

Figure 8D:
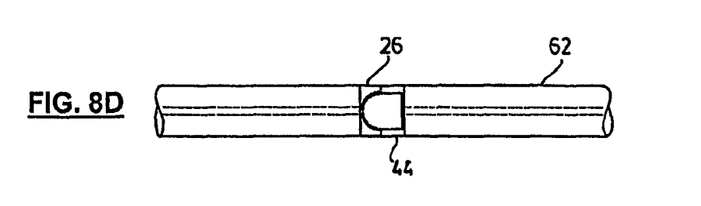

The next step, shown in FIG. 8D is the fusion splicing of the two cavities 26 and 44 in order to join them together. Standard fusion splicing may be used, without interference from the coatings as they have been removed from the splicing region.

Figure 8E:
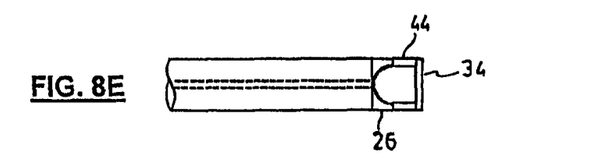

The last step, shown in FIG. 8E, consists of shaping the diaphragm optical element in order to create a flexible diaphragm 34. As explained above, this may be accomplished by cleaving, polishing, etching, or any appropriate combinations thereof.

Optical sensors manufactured with this last preferred embodiment present several advantages. The extra steps involving the coating and the polishing to clean coated splicing surfaces simplifies the splicing of these components when compared to other embodiments. This method involves up to three fusion splices, but it could also be reduced to two without limiting the selection of the lead fiber 22 if one half-cavity used in the sensor design could be etched directly inside one of the two fibers. It is worth also underlining the fact that if both cavities could be etched with good surface quality directly inside the preferably multimode standard or special fibers, this last disclosed preferred manufacturing method requires only one fusion splicing and thus could be economically very interesting. Such a case would generally occur only for applications where a multimode fiber could be used as the lead optical fiber, which is not necessary a limiting factor if an appropriate Fabry-Perot interrogating method is used, such as white light Fabry-Perot interferometry.

Of course, the embodiment of FIGS. 8A to 8E could easily be adapted to produce sensors incorporating any of the variants discussed above, for example with respect to the shapes of the spacer or of the diaphragm.

In summary, the present invention provides optical sensors having an inwardly curved spacer, and various methods of manufacturing such sensors.

The manufacturing of an inwardly curved spacer has several advantages over the prior art, for example with reference to a spacer forming a hollow tube. A spacer having such a profile provides good dimensional stability of the sensor structure during manufacturing and splicing procedures, especially during splicing of the diaphragm optical element to the formed spacer. This simplifies handling of the structure during splicing and also increases the maximum achievable sensitivity, since the controlled etching that can reduce the diaphragm thickness below 1 µm, is limited by the initial diaphragm quality. When compared to a hollow tube spacer, the inwardly curved cavity provides increased mass of solid material and reduces the volume air in the Fabry-Perot cavity, both of these factors contributing to a better flatness, and lower perturbations of the diaphragm surface, which is inevitably perturbed by splicing process. In addition, thicker spacer walls and the inwardly curved shape are proven to be more dimensionally stable. This makes the sensor more robust during manufacturing, packaging and final use.

Furthermore, as will be understood by one skilled in the art, the use of an inwardly curved spacer increases the manufacturability of sensors with diaphragms larger than with methods involving the use of hollow tube such as known in the art. As a matter of fact the prior art describes sensors with a spacer between diaphragm and lead fiber is made from hollow tube. In such design the diaphragm diameter is determined by inner diameter of hollow tube. When the sensor is built in such a way that lead fiber and hollow tube have the same diameter there will be a practical limitation on the thickness of the hollow tube wall mainly for two reasons. First, hollow tube walls needs to be sufficiently thick to provide good mechanical stability of the sensor, especially during sensor assembly, packaging or use in environments where side wall could directly come into contact with surrounding objects. Second, during the sensor manufacturing by fusion splicing, the hollow tube spacer must maintain its geometrical integrity in order to provide good parallelism of bound material that forms the diaphragm. Minor degradation of diaphragm parallelism leads to serious degradation of the sensor optical performances such as interference fringe visibility. Furthermore if other methods than fusion splicing are used to bind the diaphragm to the hollow tube spacer, even larger bonding surfaces are needed for good adhesion bonding between the two elements.

In inwardly curved spacer sensors presented in this invention, such limitations are significantly reduced. The average thickness of the spacer wall is considerably larger than the inner diameter at the spacer forward end-surface that defines the flexible part of the diaphragm. Since sensitivity is strongly related to diameter of the flexible part of the diaphragm (generally proportional to the power 4 of this parameter), any increase in the diaphragm diameter has an important effect of the final sensor sensitivity. The use of inwardly curve spacer improves therefore mechanical robustness of the sensor, production yield and also sensitivity that can be achieved for such sensors. The production yield is mainly increased due to better geometrical stability during fusion splicing when the viscosity of the materials is lowered in order to allow adequate fusion bonding.

Further more, inwardly shaped spacer sensor allow the manufacturing of sensors with diaphragm diameter larger that lead in fiber diameter as described in FIG. 6A that can considerably further increase the sensitivity of the sensor or it can allow for smaller diameter lead in fiber (e.g. 80 µm) to be used in sensor design. This could be advantageous in applications such as in the medical field where lead fiber diameter and flexibility are prime concerns.

Having thus inwardly curved spacer allows thus to increase as well the sensitivity of sensors with diaphragms larger than with methods involving the use of hollow tube such as known in the art.

By appropriately selecting the etching time and the doping profile in the spacer optical element, spacers of various profiles may be obtained, such as those shown in FIGS. 5A to 5E. For all the illustrated embodiments, the core of the spacer optical element is recessed by the etching process while its cladding mainly remains intact. The invention is however not limited to such embodiments and other manners of producing the desired shapes may be used, such as for example providing a glass rod with an appropriate dopant profile. For the embodiment of FIG. 5A, the doping profile and etching time were selected so that the spacer optical element is etched in a way that the end face of the lead optical fiber is contiguous to the innermost point of the etched end surface. As mentioned above, this is the preferred embodiment for a single mode lead fiber configuration. In another preferred embodiment, shown in FIG. 5B, the spacer optical element is etched such that there is a significant portion of non recessed core between the curved end surface 32 and the rearward boundary 40 of the spacer 26 contiguous to the end face 24 of the lead fiber. In this case, the reflectivity could be lower due to possible diffusing surface asperities, but it could be improved by fusion arc heating of the fiber end or other system that improves inner surface quality. In addition, appropriate surfaces can also advantageously be coated with a dielectric coating, as is well known in the art to improve reflectivity. FIG. 5C shows an embodiment where the core of the spacer optical element is etched rapidly and a hollow section 31 is thereby created forward of the inwardly curved surface 32. Over-etching is also possible as shown in FIG. 5D, where the spacer optical element is etched in a way to remove a significant part of the core near the end face 24 of the lead optical fiber 22. In this embodiment, the etching might damage the core and electric arc reheating or similar surface reconditioning procedures may be required. This approach can be used to accommodate lead optical fibers having larger core sizes. The spacer optical fiber may also be provided with triangular or trapezoidal doping profiles. FIG. 5E shows such an embodiment where the curved end surface of the spacer is V-shaped, creating a conical cavity. All variations described in FIGS. 5A through 5D can also applied be to conical or other forms of spacers.

Referring to FIGS. 6B and 6C, according to an alternative embodiment of the invention, the doping profile of the spacer optical element and appropriate etching conditions could be selected so that the etching of the spacer optical element creates a micro-lens 42 inside the spacer 26, in front of the lead optical fiber 22. The spacer 26 therefore has a profile reminiscent of a W shape. In this case, the etching process is preferably stopped before reaching the rearward boundary 40 of the spacer 26, to allow the focusing of the light from the lead optical fiber 22 into a small central spot on the diaphragm 34. This increases the sensitivity of the sensor as the center of the diaphragm is the region experiencing the largest deflection. Another advantage of focusing the light from the lead optical fiber 22 in the central part of the diaphragm is that this surface stays also the most parallel to the first end face of the lead optical fiber with which it forms the Fabry-Perot cavity, even when the diaphragm is deflected. The presence of a protuberance created by the micro-lens in the center of the Fabry-Perot cavity could also help to protect the sensor from over-pressure conditions; in such conditions, the diaphragm could touch the tip of the micro-lens which provides mechanical support and prevents a further deflection of the diaphragm. The micro-lenses could also be used to collimate light and thereby allow for the creation of a long and low loss cavity, which may be advantageous for certain sensor signal processing methods. In order to make the optical design of the micro-lens more flexible, an additional spacer 44 having optimal optical properties could also be added between the end face of the lead optical fiber and the spacer rearward boundary 40 of the spacer 26, as shown in FIG. 6C. The additional spacer 44 may simply be embodied by a solid glass rod which may be manufactured splicing, cleaving and polishing techniques such as previously described.

Figure 11:
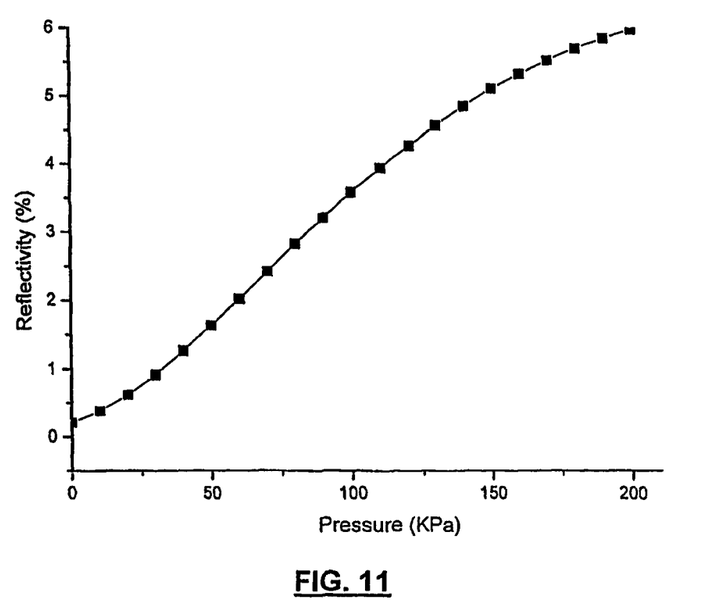
FIGS. 11 and 12 are graphs showing experimental results obtained for two optical sensors according to preferred embodiments of the invention.
Figure 12:
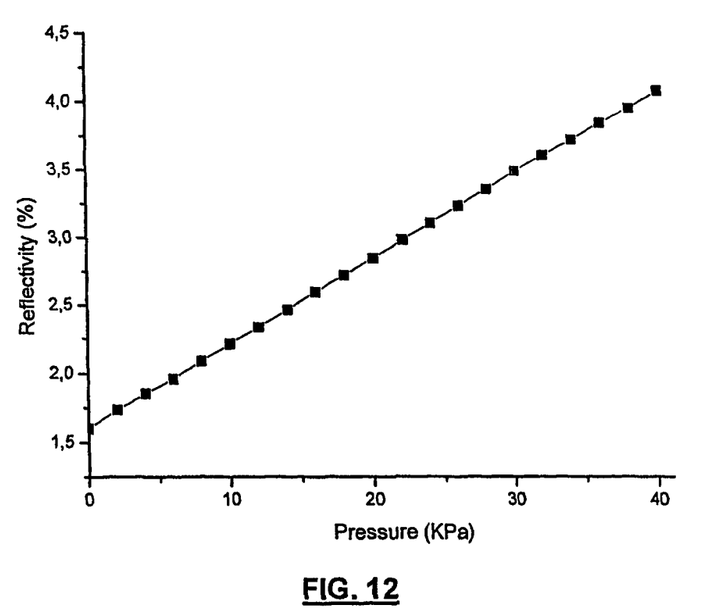

The method described in the present invention allows for manufacturing of sensors for different pressure ranges. FIGS. 11 and 12 show typical characteristics for sensors according to embodiments of the present invention manufactured for pressure ranges of 0-200 kPa and 0-40 kPa respectively. The illustrated results demonstrate reflectivity of the sensors under coherent illumination at wavelength of 1550 nm as a function of pressure. Other ranges are also accessible with good sensor design as known in the art.

Of course, numerous modifications could be made to the embodiments described above without departing from the scope of the invention as defined in the appended claims.

The invention claimed is:

1. A Fabry-Perot optical sensor for sensing a parameter, the optical sensor comprising:
   a lead optical fiber having front and rear ends; the front end of the lead optical fiber having a footprint;
   a spacer carried on the front end of the lead optical fiber and contained within the footprint thereof; the spacer having front and rear margins and a body extending between the front and rear margins; the body having formed in the front margin a Fabry-Perot cavity extending toward the rear margin; the Fabry-Perot cavity having a profile selected from the group consisting of: (a) a semi-circular profile; (b) a parabolic profile; and (c) a truncated parabolic profile; and
   a diaphragm attached to the front margin of the spacer and extending across the Fabry-Perot cavity; the diaphragm being flexible in response to changes in the parameter; the diaphragm defining a forward reflector of the Fabry-Perot cavity.

2. The optical sensor of claim 1 wherein the Fabry-Perot cavity is delimited by a peripheral body wall of variable thickness; the thickness of the peripheral body wall being greater at a location proximate the rear margin than at a location proximate the front margin.

3. The optical sensor of claim 2 wherein the peripheral body wall has an outer surface and a curved inner surface; the thickness of the peripheral body wall being measured between the outer surface and the curved inner surface.

4. The optical sensor of claim 1 wherein the spacer is fixed to the lead optical fiber by fusion splicing.

5. The optical sensor of claim 1 wherein the diaphragm is attached to the spacer by fusion splicing.

6. The optical sensor according to claim 1, wherein the Fabry-Perot cavity opens onto the front end of the lead optical fibre.

7. The optical sensor according to claim 1, wherein:
the lead optical fiber has an end face at the front end thereof;
the profile of the Fabry-Perot cavity is one of a semi-circular profile and a parabolic profile; and
the rearmost boundary of the Fabry-Perot cavity is contiguous with the end face of the lead optical fiber.

8. The optical sensor according to claim 1, wherein:
the lead optical fiber has an end face at the front end thereof;
the profile of the Fabry-Perot cavity is one of a semi-circular profile and a parabolic profile; and
the rearmost boundary of the Fabry-Perot cavity is disposed forwardly of the end face of the lead optical fibre.

9. The optical sensor according to claim 1, wherein the body of the spacer has a footprint sized substantially equal to the footprint belonging to the front end of the lead optical fibre.

10. The optical sensor according to claim 1, wherein the diaphragm is made of at least one inorganic material.

11. The optical sensor according to claim 10, wherein the at least one inorganic material is selected from the group consisting of pure silica glass, doped silica glass, composite glass and sapphire.

12. The optical sensor according to claim 1, wherein the diaphragm has a front face and a rear face; and the front face of the diaphragm is planar.

13. The optical sensor according to claim 1, wherein the diaphragm has a front face and a rear face; and the front face of the diaphragm is non-planar.

14. The optical sensor according to claim 1, wherein the diaphragm has a front face, a rear face and at least one protuberance projecting from at least one of the front and rear faces.

15. The optical sensor according to claim 14, wherein the at least one protuberance projects from the front face of the diaphragm.

16. The optical sensor according to claim 14, wherein the at least one protuberance projects from the rear face of the diaphragm.

17. The optical sensor according to claim 14, wherein the at least one protuberance includes a first protuberance projecting from the front face of the diaphragm and a second protuberance projecting from the rear face of the diaphragm.

18. The optical sensor according to claim 14, wherein the at least one protuberance is centrally disposed on the diaphragm.

19. The optical sensor according to claim 1, further comprising a protective hollow member projecting forward of the diaphragm.

20. The optical sensor according to claim 19, wherein the diaphragm and the protective hollow section form a monolithic structure.

21. The optical sensor according to claim 19, further comprising a protective tubing for fitting over the diaphragm, the spacer and at least a portion of the lead optical fiber.

22. The optical sensor according to claim 1, the protective tubing is filled with a medium having at least one of transducing properties and protective properties.

23. The optical sensor according to claim 1, further comprising a protective material coating at least the diaphragm, the protective material having at least one of transducing properties and protective properties.

24. The optical sensor according to claim 1, wherein parameter to be sensed is selected from the group consisting of: (a) force; (b) acceleration; (c) acoustic waves; (d) vibrations; and (e) any combinations thereof.

25. The optical sensor according to claim 1, wherein parameter to be sensed is pressure.

26. The optical sensor according to claim 1, wherein:
the diaphragm has a front face and a rear face; and
the forward reflector of the Fabry-Perot cavity is defined by the rear face of the diaphragm.

27. The optical sensor according to claim 1, wherein:
the diaphragm has a front face and a rear face; and
the forward reflector of the Fabry-Perot cavity is defined by the front face of the diaphragm.

28. The optical sensor according to claim 1, wherein:
the profile of the Fabry-Perot cavity is one of a semi-circular profile and a parabolic profile; and
the rearward reflector of the Fabry-Perot cavity is defined by rearmost boundary of the Fabry-Perot cavity.

29. The optical sensor according to claim 1, wherein:
the profile of the Fabry-Perot cavity is one of a semi-circular profile and a parabolic profile;
the lead optical fiber having an end face at the front end thereof; and
the rearward reflector of the Fabry-Perot cavity is defined by the end face of the lead optical fiber.

30. The optical sensor of claim 29 wherein the end face of the lead optical fiber is coated with a semi-reflective layer.

* * * * *